(12) United States Patent
Krikorian et al.

(10) Patent No.: US 7,106,243 B2
(45) Date of Patent: Sep. 12, 2006

(54) TECHNIQUE FOR ENHANCED QUALITY HIGH RESOLUTION 2D IMAGING OF GROUND MOVING TARGETS

(75) Inventors: Kapriel V. Krikorian, Calabasas, CA (US); Robert A. Rosen, Simi Valley, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/184,694

(22) Filed: Jul. 19, 2005

(65) Prior Publication Data

US 2006/0109162 A1 May 25, 2006

Related U.S. Application Data

(63) Continuation-in-part of application No. 10/996,024, filed on Nov. 23, 2004.

(51) Int. Cl.
  *G01S 13/90* (2006.01)
  *G01S 13/00* (2006.01)

(52) U.S. Cl. ............ 342/25 B; 342/25 R; 342/25 A; 342/25 F; 342/89; 342/175; 342/176; 342/179; 342/195; 342/196

(58) Field of Classification Search .... 342/25 R–25 F, 342/82, 89, 90, 159–164, 175, 176, 179, 342/190–197
See application file for complete search history.

(56) References Cited

U.S. PATENT DOCUMENTS 3,735,400 A * 5/1973 Sletten et al. ............... 342/161
4,086,590 A * 4/1978 Goggins, Jr. ............... 342/25 B
4,855,747 A * 8/1989 Steinberg .................... 342/179
4,924,229 A * 5/1990 Eichel et al. .............. 342/25 E
5,122,803 A * 6/1992 Stann et al. ................ 342/25 B
H1720 H * 4/1998 Chen ......................... 342/25 E
5,805,099 A * 9/1998 Nagata ....................... 342/25 B
6,400,306 B1 * 6/2002 Nohara et al. ............. 342/25 R
6,518,914 B1 * 2/2003 Peterson et al. .......... 351/25 R
6,549,160 B1 * 4/2003 Meyer-Hilberg .......... 342/25 R
6,697,010 B1 * 2/2004 Lam ......................... 342/25 R
2002/0033765 A1* 3/2002 Bickert et al. ............. 342/162

FOREIGN PATENT DOCUMENTS

EP   0778471 A1 * 6/1997

OTHER PUBLICATIONS

"Signal Based Motion Compensation for Synthetic Aperture Radar"; DOE Report TSC-B022-I99-0024; DOE Grant No. DE-FG03-96ER82294; Technology Service Corp.; Los Angeles, California; Jun. 7, 1999.*
J.R. Fienup, "Synthetic-aperture Radar Autofocus by Maximizing Sharpness"; Optics Letters; vol. 25, No. 4; Feb. 15, 2000; pp. 221-223.*

* cited by examiner

*Primary Examiner*—Bernarr E. Gregory
(74) *Attorney, Agent, or Firm*—Leonard A. Alkov; John E. Gunther; Karl A. Vick

(57) ABSTRACT

A radar receiver on a moving platform images a moving target and non-moving clutter using a single SAR array. The radar receiver converts the radar returns into digital radar returns and motion compensates the digital radar returns with respect to a reference, then applies further phase compensation to obtain an autofocused synthetic aperture image. A plurality of moving target pixels descriptive of the moving target are detected within the autofocused synthetic aperture image. The plurality of moving target pixels are transformed from the autofocused image to the time domain. The time domain moving target data is focused by iteratively applying a phase compensation to the time domain moving target data.

12 Claims, 5 Drawing Sheets

TECHNIQUE FOR ENHANCED QUALITY HIGH RESOLUTION 2D IMAGING OF GROUND MOVING TARGETS

This application is a continuation in part of U.S. Patent and Trademark application Ser. No. 10/996,024, filed Nov. 23, 2004, titled "Technique for Cancellation of Elevated Clutter for the Detection of Fixed and Ground Moving Targets Under Trees".

BACKGROUND OF THE INVENTION

1. Field of Invention

This invention is in the field of moving target detection for use with radar imaging and/or target detection using a single channel receiver.

2. Description of the Related Art

Synthetic Aperture Radar (SAR) radar is used for ground mapping as well as target identification. The general principle behind SAR is to coherently combine the amplitude and phase information of radar returns from a plurality of sequentially transmitted pulses from a relatively small antenna on a moving platform.

The plurality of returns creating a SAR image generated by the transmitted pulses along a known path of the platform make up an array. During the array, amplitude as well as phase information returned from each of the pulses, for each of many range bins, is preserved. The SAR image is formed from the coherent combination of the amplitude and phase of return(s) within each range bin, motion compensated for spatial displacement of the moving platform during the acquisition of the returns for the duration of the array.

The plurality of pulses transmitted during a SAR array, when coherently combined and processed, result in image quality comparable to a longer antenna, corresponding approximately to the "length" traveled by the antenna during the array. Imaging in SAR depends on Doppler frequency bins. A moving target being imaged will experience a Doppler frequency shift, hence be possibly imaged in an inaccurate Doppler bin. Thus, where moving ground targets of interest are superimposed on stationary, non-moving clutter, imaging and locating of moving targets may be degraded because there is no definite correspondence between target angle and the Doppler shift of the target. Sometimes, resolving the uncertainty in position of a moving target with respect to the SAR map, requires more than one target measurement, presenting undesirable extended target acquisition time.

SUMMARY OF THE INVENTION

Above limitations are reduced by a radar receiver on a moving platform for imaging a moving target from radar returns from a scene containing the moving target and non-moving clutter using a single SAR array. The radar receiver comprises an analog to digital converter for converting the radar returns into digital radar returns descriptive of said scene containing the moving target and non-moving clutter, and a digital computer for performing the steps of:

motion compensating the digital radar returns with respect to a reference, said reference within said scene to obtain a motion compensated data for computing a synthetic aperture image of said scene;

estimating a phase error of said clutter within said motion compensated data and compensating for said phase error said motion compensated data to obtain an autofocused synthetic aperture image, said autofocused synthetic aperture image composed of pixels;

detecting a plurality of moving target pixels descriptive of said moving target among said pixels of said autofocused synthetic aperture image;

transforming said plurality of moving target pixels from said autofocused image to a time domain moving target (I/Q equivalent) data;

focusing the time domain moving target data by iteratively applying a phase compensation to said time domain moving target data.

DETAILED DESCRIPTION OF THE INVENTION

The present invention describes an apparatus and method for detecting moving targets within a SAR image.

Figure 1:
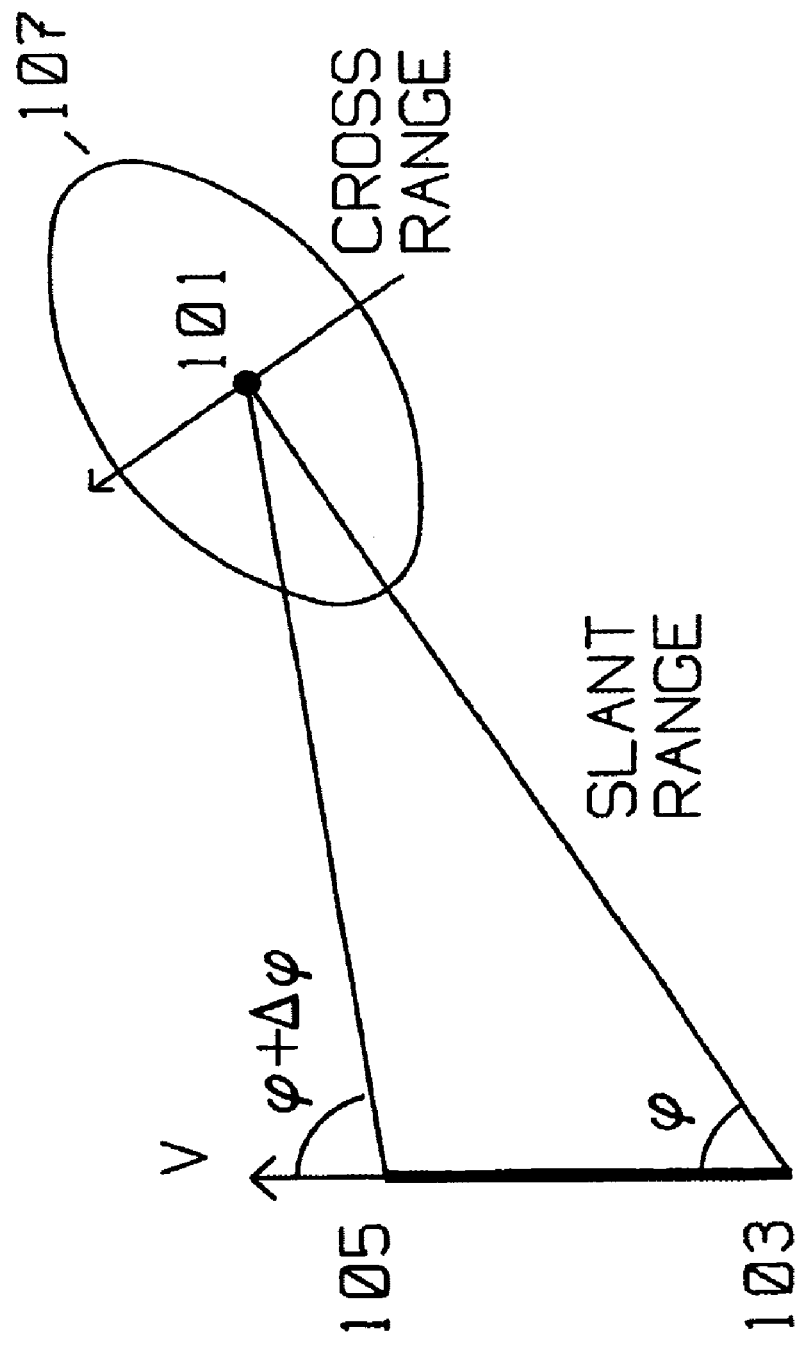
FIG. 1 is a SAR spotlight configuration of the prior art.

FIG. 1 shows the typical geometric relationship between a moving platform carrying a radar transmitter/receiver using Synthetic Aperture (SAR) spotlight methods and target area 101 to be imaged by said radar transmitter/receiver. The moving platform is initially at position 103, travels with velocity V in the direction shown to position 105. In SAR spotlight mode, the SAR antenna is actively oriented towards scatterer 101 as the platform moves with respect to scatterer 101 with velocity V. The moving platform moves from position 103 to position 105, while adjusting the side looking angle from $\phi$ to $\phi+\Delta\phi$ for spotlight mode so that the antenna keeps illuminating target area 101. Antenna illumination with radar energy covers area 107 during the array length, and includes target area 101. Similarly, the antenna receive pattern covers area 107, and includes target area 101. Radar pulses are transmitted and corresponding returns received at many points during the array (frame) length between position 103 and position 105. SAR radar is well known in the art and, for example, is described by W. Carrara, et al, in *Spotlight Synthetic Aperture Radar*, Artech house, 1995, incorporated herein be reference in its entirety. The present invention is not limited to the spotlight mode as it will also apply to other SAR modes.

Figure 2:
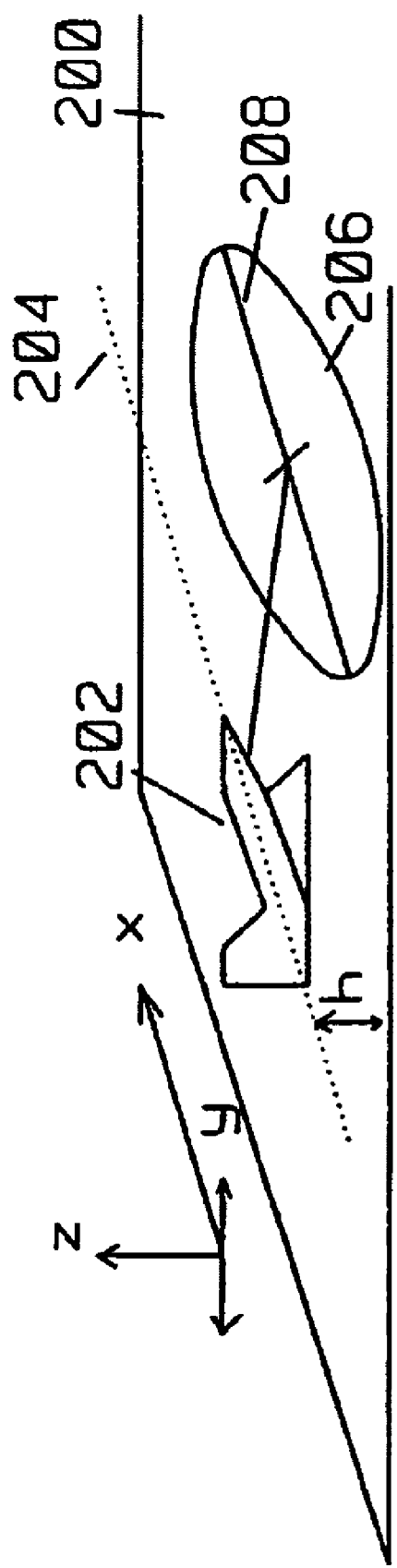
FIG. 2 shows a path of a moving platform (flying aircraft) defining an ideal, straight and level path along the centerline of a scene to be acquired for a SAR image.

A few assumptions are made to illustrate the operation of this invention, as shown in FIG. 2. The nominal flight path of the moving platform ( flying aircraft) during the SAR array (frame) is in a straight line parallel to the centerline of the scene being acquired. Aircraft ideal track is a straight line in a plane parallel to the flight track, as shown in FIG. 2. Aircraft 202 is following flight path 204 in the x direction, at an altitude h above flat area 200 and acquiring SAR image of scene 206. Scene 206 has a centerline 208, where centerline 208 is parallel to flight path 204. In FIG. 2, and used in this invention, x direction is the direction of flight, with velocity $V_x$;

y direction is perpendicular to x, parallel to the plane of the scene being imaged; and z direction is normal to the x, y plane of the scene, defined by $\hat{z}=\hat{x}\times\hat{y}$.

Figure 3:
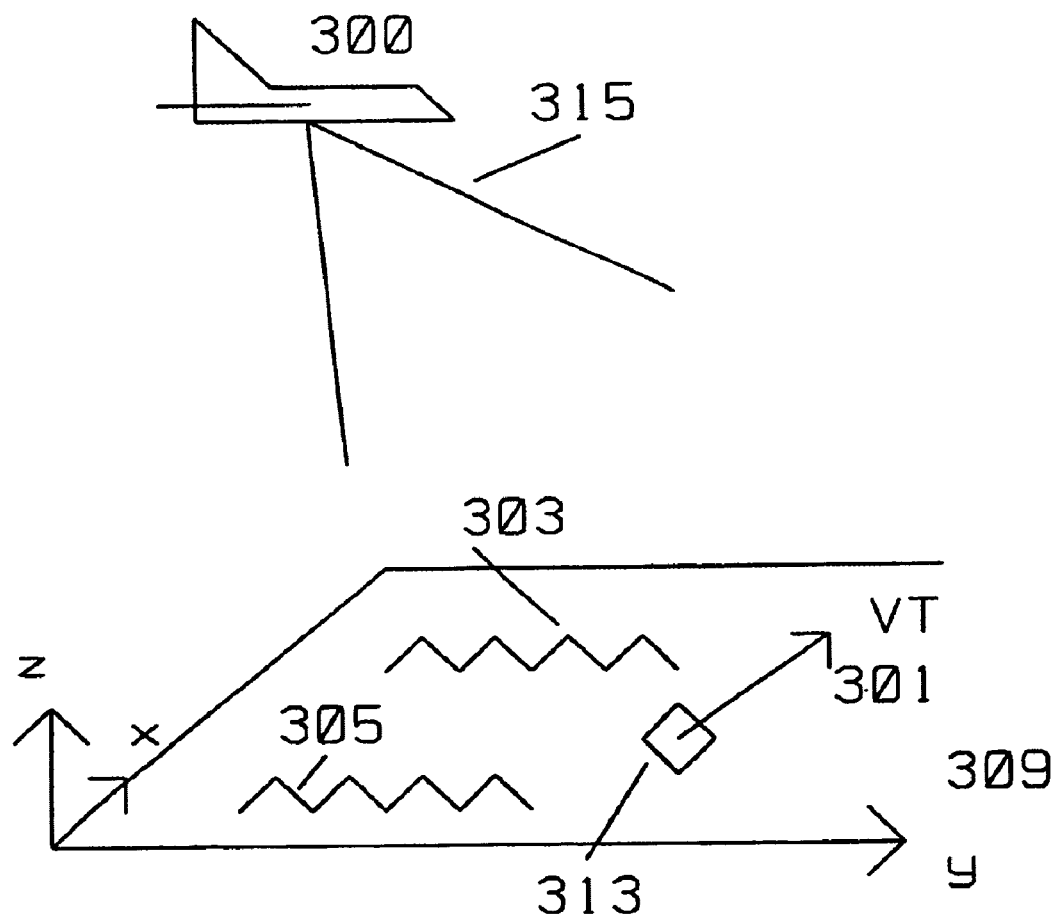
FIG. 3 shows a typical scene to be imaged where clutter in the vicinity of a moving target interferes with the acquisition of a two dimensional SAR image.

FIG. 3 shows a side view of moving radar receiver 300 having an illuminating and receiving aperture 315, for using the same waveform for simultaneous SAR and GMTI in acquiring concurrent synthetic aperture images of a ground moving target 313 on x, y surface 309. Surface 309 is defined as in FIG. 2 in the x, y plane. The target 313, when slow moving or turning towards platform 300 is an endo clutter (GMTI) target. If the target 313 is a relatively fast mover, it becomes an exo clutter (GMTI) target. Target 313 is a moving target with motion VT 301 in the direction shown.

The radar receiver 300 on a moving platform digitizes radar returns reflected from a combination of a moving target 313 on surface 309, and from non-moving, ground clutter 303 and 305. The radar has a radar beam 315 for concurrently and non-selectively illuminating surface 309 and clutter 303 and 305.

Figure 4:
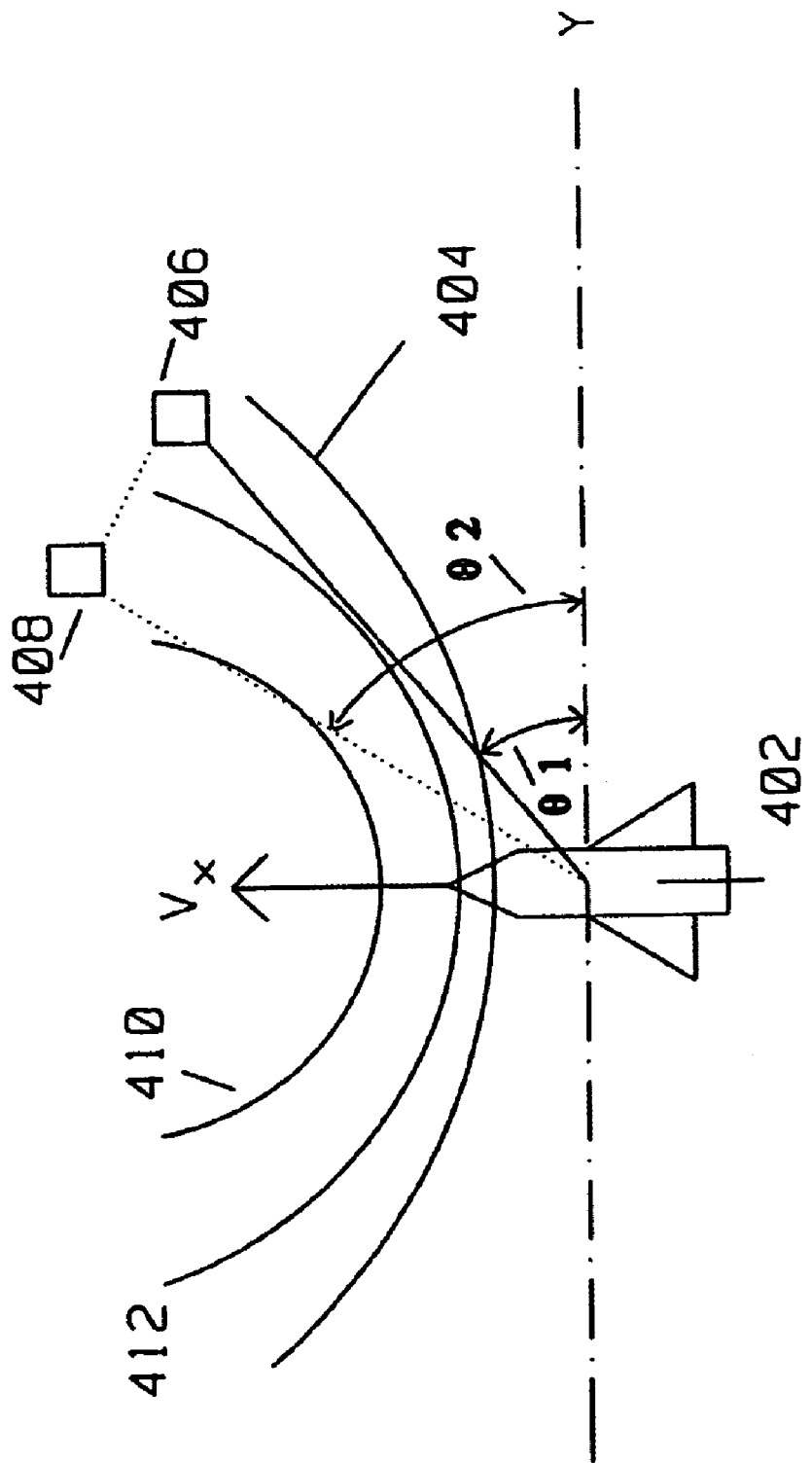
FIG. 4 shows the position of exo-clutter targets and endo-clutter targets with respect to Doppler frequency contours.

The top view of FIG. 3 is shown in FIG. 4. In FIG. 4, Doppler contours 404, 410 and 412 are determined by the look angle with respect to the direction of travel $V_x$ of platform 402. Target 406 is either an endo-clutter or exo clutter target.

For example, if target 406 is a slow mover (endo-clutter), it would be mapped an angle θ1 measured with respect to the Y axis. If target 406 accelerates to a higher velocity component perpendicular to the Doppler contours, it is now mapped as target 408, an exo clutter target, at θ2.

Target returns that do not appear to originate on a SAR map from the same angle of arrival as directly competing clutter at the same Doppler as the target, such as moving target 408, are exo clutter targets. Conversely, target returns that originate from slow moving or turning targets such as 406, competing with main lobe clutter, such as 303 and 305, are examples of endo clutter targets.

Typically, in a simplified form, $$f_{clutter} = -\frac{2}{\lambda}V_x \sin(\theta_{clutter})$$

$$f_{target} = -\frac{2}{\lambda}V_x \sin(\theta_{clutter}) + V_{target}$$

where

λ is the wavelength of the transmitted radar signal;

$f_{clutter}$ is the radar return frequency shift due to Doppler shift from motion of platform 300;

$f_{target}$ is the radar return frequency shift due to Doppler shift from motion of platform 300 plus component of motion $V_{target}$ of the target itself perpendicular to the Doppler contours;

θ is the angle with respect to direction of travel of the moving platform.

Thus, when mapping a moving target, theoretically at least two separate radar measurements are required:

a) acquire a SAR map, $f_{clutter}$ related, containing the clutter, with the moving target as part of the clutter, and b) measurement of velocity of the target, $f_{target}$ related, to re-locate the position of the moving target within the SAR map in response to target velocity.

The present invention creates the SAR map of the ground (clutter) and properly locates a moving target on the SAR map in a single step, using the radar data generated during a SAR array.

Figure 5:
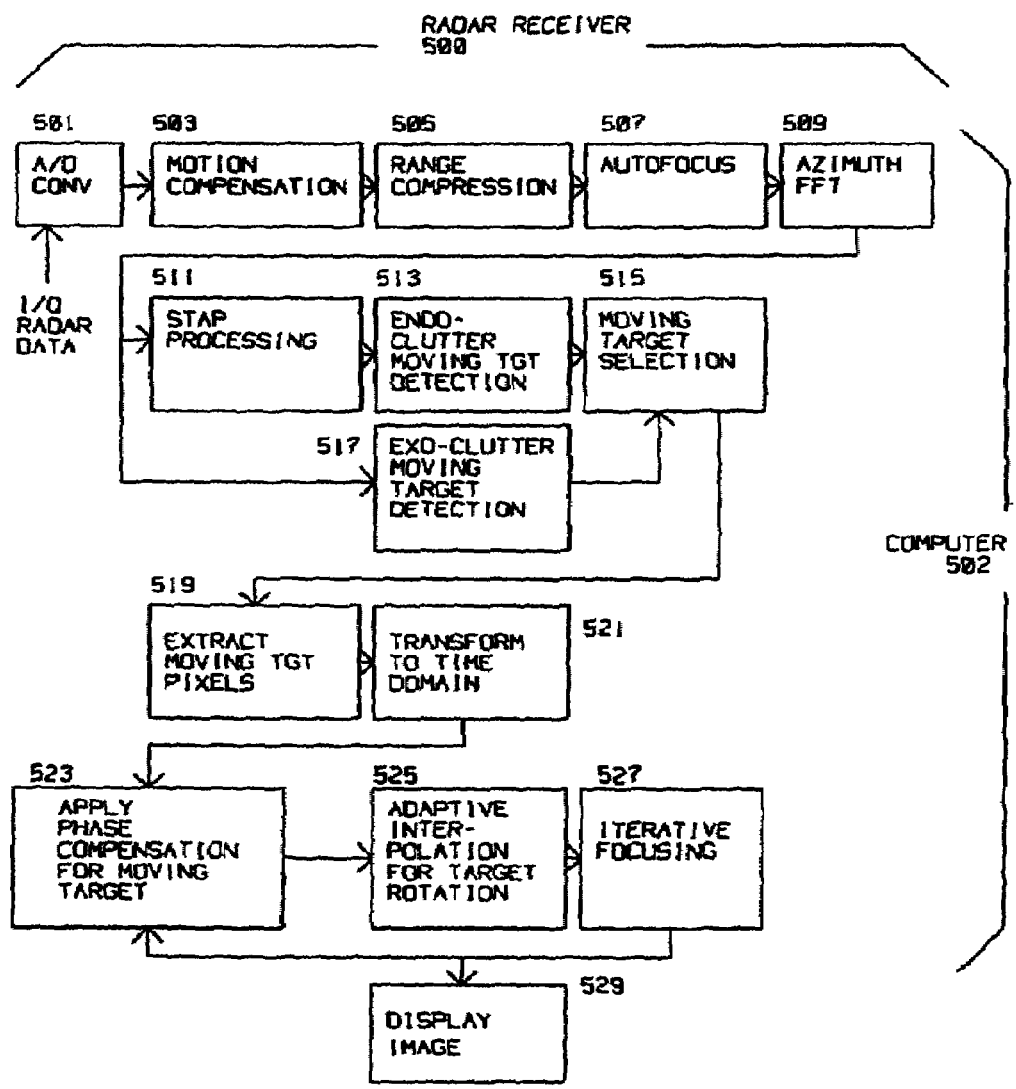
FIG. 5 is a flow diagram of the present invention for 2D imaging of both exoclutter and endo-clutter targets from a moving radar platform.

FIG. 5 shows a radar receiver 500 on a moving platform, such as aircraft 202 for imaging a moving target, such as moving target 313 from radar returns from a scene, such as scene 206 containing the moving target and stationary, immobile ground clutter such as clutter 303 and clutter 305. SAR and GMTI modes are performed simultaneously using the same waveform. The SAR image a coherent estimate of ground clutter in each pixel.

Radar receiver 500 comprises:

a) an analog to digital converter 501 for converting the radar returns into digital radar returns descriptive of the scene containing the moving target 313 and typical, non-moving ground clutter such as clutter 303 and clutter 305;

b) a digital computer 502 for performing the steps of:

1) motion compensating 503 the digital radar returns with respect to a reference, said reference within said scene being imaged to obtain a motion compensated data for computing a synthetic aperture image of the scene;

2) Performing range compression 505 on the motion compensated data;

3) Estimating a phase error of the clutter 303 and 305 within the motion compensated data and compensating for the phase error within the motion compensated data to obtain an autofocused synthetic aperture image 507, said autofocused synthetic aperture image composed of pixels;

4) Performing an azimuth Fast Fourier Transform 509 on the autofocused image;

5) Detecting plurality of moving target pixels descriptive of said moving target among said pixels of said autofocused synthetic aperture image. The detection of the moving target can be conducted a number of ways. For example, as shown, an azimuth FFT 509 is performed over the SAR image. The output from Azimuth FFT 509 is presented to STAP processing 511 for detecting endo-clutter moving target(s). Concurrently the output from Azimuth FFT 509 is also examined to detect exo-clutter target(s) in Exo clutter moving target detection 517. A moving target is selected in moving target selection 515 for further processing.

6) Extracting for the selected target, its pixels from the autofocused image in Extract Moving Target Pixels 519, thus yielding a plurality of target pixels descriptive of the moving target.

7) Transforming said plurality of moving target pixels from said autofocused image in Transform to Time Domain 521 to obtain time domain moving target data. This yields the equivalent if I/Q data initially generated by the A/D converter 501.

8) focusing said time domain moving target data by iteratively applying a phase compensation to said time domain moving target data 523,525,527. In Phase Compensation for Moving Target 523, time domain phase compensation is computed. Adaptive Interpolation for Target Rotation 525 compensates in the time domain for rotation of the moving target. Iterative Focusing 527 repeats the phase compensation in the time domain until an acceptable criterion is reached.

9) Display 529 displays the SAR image and the moving target properly located on the SAR map, i.e. the autofocused image.

In summary, for exo-clutter moving targets, the SAR target pixels are extracted from the SAR image, then transformed back to the time domain and re-processed. This allows the correct phase history to be applied for motion compensation of the moving target. The angular rate of the target is iteratively detected through image focusing before the high resolution 2D target image is displayed.

For endo-clutter targets, STAP processing is optionally performed for ground moving target detection. The target pixels are then transformed back to the time domain and re-processed with the correct target phase history to generate the moving target image, as detailed for the exo-clutter target.

All references cited in this document are incorporated herein in their entirety by reference. Specifically, *Synthetic Aperture Radar* by John J Kovaly, ISBN 0-89006-056-8, Artech House, and *Radar Technology* by Eli Brookner, ISBN 0 89006 0215, Artech House, are incorporated herein in their entirety by reference to provide a background for this invention and definition of variables used herein.

Although presented in exemplary fashion employing specific embodiments, the disclosed structures are not intended to be so limited. For example, the SAR map containing the moving target need not be generated by a single SAR frame, although convenient to do so. With proper motion compensation, data from multiple SAR frames, multiple radars, or multiple bistatic radars can be similarly treated to obtain the beneficial results herein.

Those skilled in the art will also appreciate that numerous changes and modifications could be made to the embodiment described herein without departing in any way from the invention.

The invention claimed is:

1. A radar receiver on a moving platform for imaging a moving target from radar returns from a scene containing said moving target and clutter, said radar receiver comprising:
    an analog to digital converter for converting said radar returns into digital radar returns descriptive of said scene containing said moving target and said clutter;
    a digital computer for performing the steps of:
    motion compensating said digital radar returns with respect to a reference, said reference within said scene to obtain motion compensated data for computing a synthetic aperture image of said scene;
    estimating a phase error of said clutter within said motion compensated data and compensating said motion compensated data for said phase error to obtain an autofocused synthetic aperture image, said autofocused synthetic aperture image composed of pixels;
    detecting a plurality of moving target pixels descriptive of said moving target among said pixels of said autofocused synthetic aperture image;
    transforming said plurality of moving target pixels from said autofocused image to a time domain moving target data;
    focusing said time domain moving target data by iteratively applying a phase compensation to said time domain moving target data.

2. A radar receiver as described in claim 1 wherein said phase compensation is computed using an adaptive interpolation for rotation of said moving target.

3. A radar receiver as described in claim 2 wherein said moving target is an endoclutter target and a Space Time Adaptive Algorithm (STAP) is applied to detect said moving target pixels describing said endoclutter target.

4. A radar receiver as described in claim 3 wherein said moving target is displayed within said autofocused image.

5. A radar receiver as described in claim 2 wherein said moving target is an exoclutter target.

6. A radar receiver as described in claim 5 wherein said moving target is displayed within said autofocused image.

7. A method for operating radar receiver on a moving platform for imaging a moving target from radar returns from a scene containing said moving target and clutter, said method comprising the steps of:
    converting said radar returns into digital radar returns descriptive of said scene containing said moving target and said clutter;
    motion compensating said digital radar returns with respect to a reference, said reference within said scene to obtain motion compensated data for computing a synthetic aperture image of said scene;
    estimating a phase error of said clutter within said motion compensated data and compensating said motion compensated data for said phase error to obtain an autofocused synthetic aperture image, said autofocused synthetic aperture image composed of pixels;
    detecting a plurality of moving target pixels descriptive of said moving target among said pixels of said autofocused synthetic aperture image;
    transforming said plurality of moving target pixels from said autofocused image to a time domain moving target data;
    focusing said time domain moving target data by iteratively applying a phase compensation to said time domain moving target data.

8. A method as described in claim 7 wherein said phase compensation is computed using an adaptive interpolation for rotation of said moving target.

9. A method as described in claim 8 wherein said moving target is an endoclutter target and a Space Time Adaptive Algorithm (STAP) is applied to detect said moving target pixels describing said endoclutter target.

10. A method as described in claim 9 wherein said moving target is displayed within said autofocused image.

11. A method as described in claim 8 wherein said moving target is an exoclutter target.

12. A method as described in claim 11 wherein said moving target is displayed within said autofocused image.

* * * * *